United States Patent [19]

Bergmann

[11] Patent Number: 5,276,303
[45] Date of Patent: Jan. 4, 1994

[54] LASER BONDING SCHEME

[75] Inventor: Ernest E. Bergmann, Fountain Hill Borough, Pa.

[73] Assignee: AT&T Bell Laboratories, Murray Hill, N.J.

[21] Appl. No.: 955,168

[22] Filed: Oct. 1, 1992

[51] Int. Cl.⁵ .............................................. B23K 26/00
[52] U.S. Cl. ...................... 219/121.63; 219/121.75
[58] Field of Search .................. 219/121.64, 121.79, 219/121.63, 121.73, 121.75

[56] References Cited

U.S. PATENT DOCUMENTS

| | | | |
|---|---|---|---|
| 3,304,403 | 2/1967 | Harper | 219/121.63 |
| 4,237,363 | 12/1980 | Lemelson | 219/121.63 |
| 4,281,236 | 7/1981 | von Allmen et al. | 219/121.63 |
| 4,644,126 | 2/1987 | Schumacher | 219/121.63 |
| 4,737,612 | 4/1988 | Bruck et al. | 219/121.64 |
| 4,782,209 | 11/1988 | Caers et al. | 219/121.64 |
| 4,990,741 | 2/1991 | Moores et al. | 219/121.64 |
| 4,992,643 | 2/1991 | Fuerschbach et al. | 219/121.63 |
| 5,049,720 | 9/1991 | Fang et al. | 219/121.63 |
| 5,125,780 | 6/1992 | Budenbender | 219/121.64 X |

OTHER PUBLICATIONS

"Beam Manipulation with Optical Fibers . . . ", C. J. Nonhof et al. *Philips Tech. Rev.*, vol. 42, No. 8/9, pp. 262–264, Jun. 1986.
"Laser Soldering Makes Its Mark", D. Richards, Electronic Production, Mar. 1987 pp. 49–52.

*Primary Examiner*—C. L. Albritton
*Attorney, Agent, or Firm*—Wendy W. Koba

[57] ABSTRACT

An arrangement for providing improved efficiency in laser bonding is disclosed. In particular, at least one piece part in the arrangement is formed to include means for concentrating a beam of radiation at a predetermined attachment location (or several locations). The concentrating means may be in the form of an aperture, such as a conical or parabolic opening, which will concentrate the radiation to the area of interest. Alternatively, if the piece part is transparent to the wavelength of the radiation, the concentrating means may be in the form of a lens or grating formed on the surface of the piece part.

18 Claims, 4 Drawing Sheets

LASER BONDING SCHEME

BACKGROUND OF THE INVENTION

1. Technical Field

The present invention relates to laser bonding and, more particularly, to a scheme for improving the efficiency of a laser bonding process.

2. Description of the Prior Art

Laser bonding has been successfully utilized in a number of applications to provide joining of piece parts. See, for example, U.S. Pat. No. 4,990,741 entitled "Method of Laser Welding" and issued to R. J. Moores et al. on Feb. 5, 1991. As disclosed, first and second metallic components may be joined along a weld path, with the beam focused by a low turbulent flow of an inert shielding gas along a portion of the path. In most applications, the material used to form the piece part (plastic or metal, for example) is opaque to the optical radiation and the radiation must therefore impinge the material from the side of the point of contact. This limitation is considered to further complicate and increase the cost of laser welding systems.

Thus, a need remains in the art for increasing the utility of laser sources in various bonding applications.

SUMMARY OF THE INVENTION

The need remaining in the prior art is addressed by the present invention which relates to laser bonding and, more particularly, to a scheme for improving the efficiency of laser bonding.

In accordance with one embodiment of the present invention, at least one piece part is formed to include predefined features which concentrate the optical radiation toward predetermined locations which are to be joined.

An advantage of the concentrating features is that the piece part itself may be formed of a material which is opaque to the wavelength of optical radiation.

In one embodiment of the invention, a first piece part may be formed to include at least one aperture of a geometry (e.g., conical) which will provide concentration of the laser radiation at a predetermined location.

In an alternative embodiment, a first piece part may be formed of a transparent material and include concentrating means, for example, an integral lens, to concentrate the radiation at the predetermined location.

For an embodiment where both piece parts are transparent, an absorbing material (such as an epoxy) may be used at the interface between piece parts to absorb the radiation and become heated.

Alternatively, a first piece part may be formed to including diffraction means for concentrating the radiation near the location where the piece parts are to be joined.

An exemplary embodiment of the present invention may utilize conical apertures, with the apex of the cone located at or near the joining location.

In an alternative embodiment, the apertures may comprise a parabolic shape, thus providing heating at a number of focii, creating a plurality of joints.

Other and further embodiments and advantages of the present invention will become apparent during the course of the following discussion and by reference to the accompanying drawings.

BRIEF DESCRIPTION OF THE DRAWING

Referring now to the drawings, where like reference numerals represent like parts in several views.

DETAILED DESCRIPTION

Figure 1:
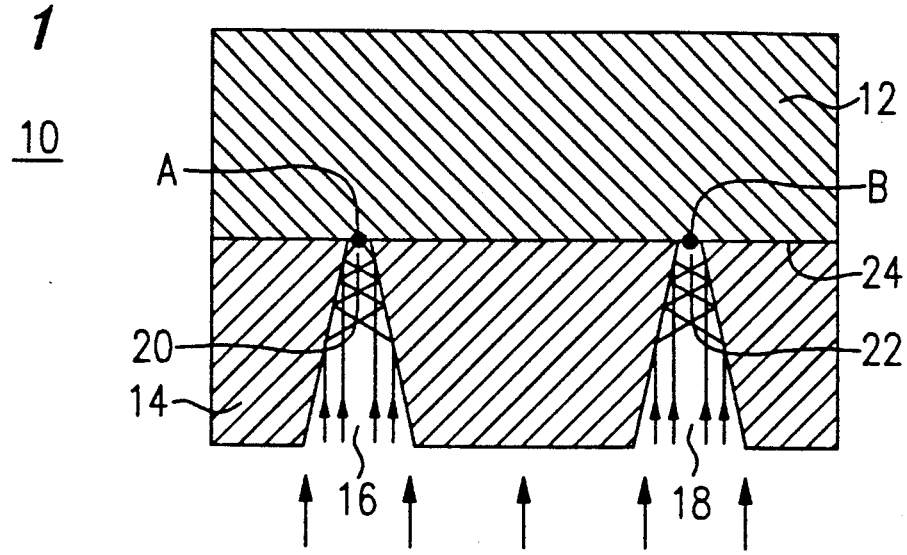
FIG. 1 illustrates an exemplary arrangement utilizing concentrated laser bonding in accordance with the present invention.

FIG. 1 illustrates an exemplary arrangement 10 for providing concentrated laser joining (which may be referred to as hereinafter as "laser welding", but may also include laser tacking or bonding) in accordance with the present invention. Arrangement 10 includes a first piece part 12 and a second piece part 14, where both piece parts may comprise a material which is opaque to optical radiation, for example, plastic or stainless steel. It is to be assumed that the piece parts are to be attached at locations A and B as shown in FIG. 1. In accordance with the present invention, piece part 14 is formed to include a pair of concentrating apertures 16 and 18. Concentrated optical radiation impinges upon piece part 14, as shown, entering apertures 16 and 18. In particular, the radiation is in the form of a plurality of collimated beams which enter apertures 16 and 18 (the geometry, number and location of the apertures being arbitrary for the purposes of the present invention and will be discussed in greater detail below; attachment will occur at any predetermined number of sites).

The radiation entering apertures 16 and 18 is illustrated as being continuously concentrated toward terminations 20 and 22 of apertures 16 and 18, respectively. In general, as long as the sidewalls of apertures 16 and 18 taper inward, a sufficient amount of radiation impinging the sidewalls will be re-directed back into the apertures and continue its propagation toward terminations 20,22. It is to be noted that terminations 20, 22 do not necessarily have to be coincident with end surface 24 of piece part 14. As along as terminations 20,22 are substantially near surface 24, sufficient heating will occur such that laser welding at locations A and B is achieved.

Figure 2:
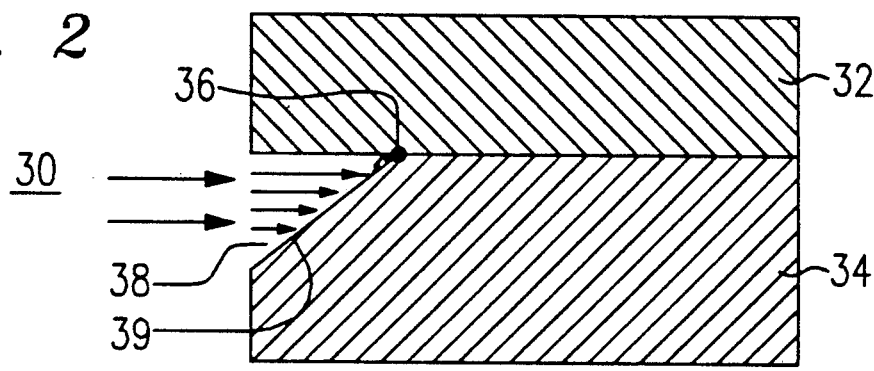
FIG. 2 illustrates an alternative arrangement utilizing concentrated laser bonding.

An alternative arrangement 30 which may utilize laser welding in accordance with the teachings of the present invention is illustrated in FIG. 2. A first member 32 is joined to a second member 34 at location 36, as shown. Here, aperture 38 is formed at the sidewall of second member 34, where sidewall 39 of aperture 38 is angled so as to direct radiation upward. First member 32 may also have an angled sidewall (not shown).

Figure 3:
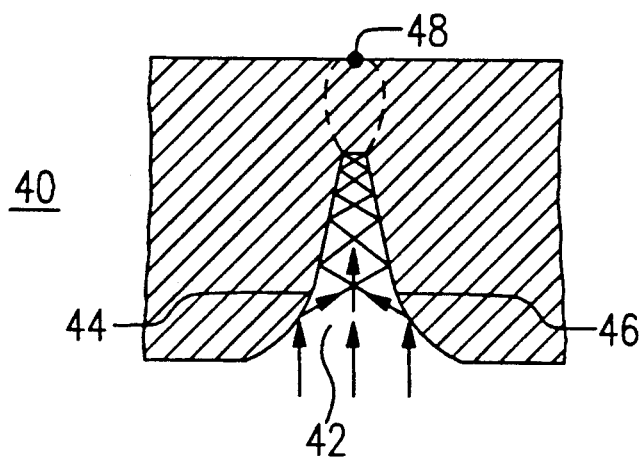
FIGS. 3 and 4 illustrate alternative aperture geometries which may be utilized in accordance with the teachings of the present invention.
Figure 4:
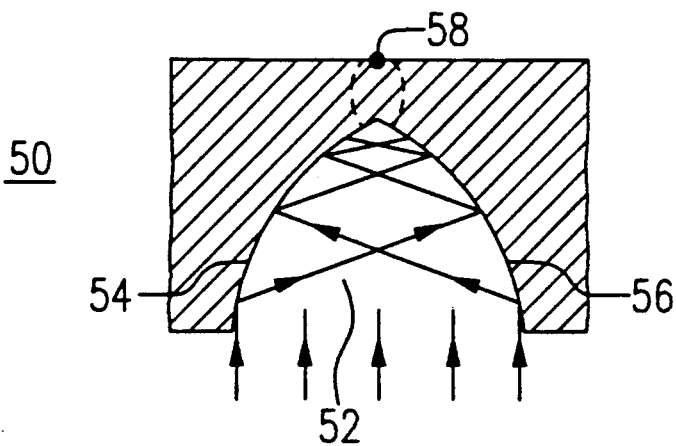

Various other aperture geometries, including those illustrated in FIGS. 3 and 4, are possible. FIG. 3 illustrates a piece part 40 including a concentrating aperture 42 for providing laser welding in accordance with the teachings of the present invention. As shown, aperture 42 includes inwardly curving sidewalls 44,46 which serve to direct the laser radiation toward weld site 48. In this particular embodiment, aperture 42 terminates within piece part 40 at a location separated from weld site 48. However, as mentioned above, the concentrating of the laser radiation at the terminations has been found to provide sufficient heating (as indicated by the dotted lines) to form a weld at site 48. Thus, the process used to actually form apertures need not be precisely controlled, and the formation of apertures at least near the depth of the weld site will usually be sufficient. FIG. 4 illustrates another piece part including an aperture terminating at a position displaced from the weld site. In particular, piece part 50 includes a concentrating aperture 52, in this case with concave curving sidewalls 54,56. Weld site 58 is also illustrated in FIG. 4 as being separated from the location of the termination of aperture 52. It is to be understood that various other apertures may be successfully used in the practice of the present invention to provide concentrated laser welding. In general, virtually any geometry capable of directing energy toward desired locations may be used in accordance with the teachings of the present invention.

Figure 5:
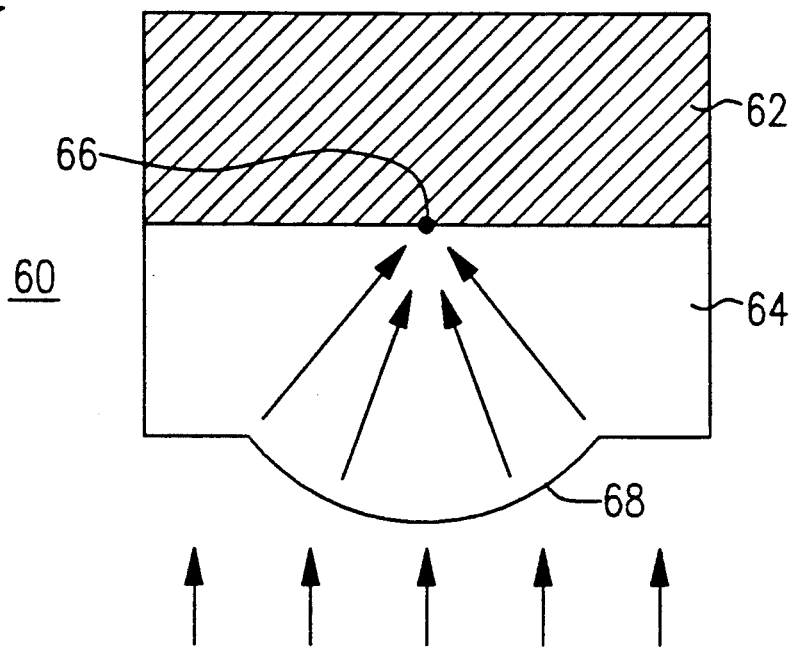
FIGS. 5-7 illustrate alternative embodiments of the present invention utilizing at least one transparent piece part and alternative concentrating means.

FIG. 5 illustrates an alternative embodiment 60 of the present invention where the re-direction of the optical radiation is provided by refraction. In particular, a first member 62 is to be attached to a second member 64 at location 66. In this case, second member 64 must be sufficiently transparent to the wavelength of the impinging radiation. As shown, second member 64 comprises a lensed surface 68 which functions to concentrate the collimated beam of radiation toward weld site 66. If second member 64 comprises a plastic material, lens 68 may be formed during a molding operation. Alternatively, if second member 64 comprises a silicon substrate, lens 68 may be etched. In any case, the shape of surface 68 is not critical, as long as a sufficient amount of radiation is concentrated relatively near to the desired weld site 66.

Figure 6:
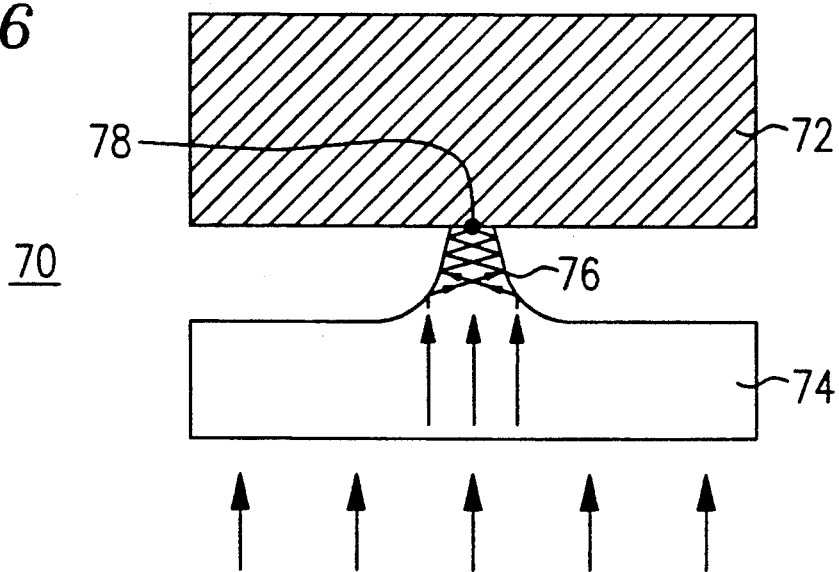

Another embodiment of the present invention which also utilizes a transparent concentrating member is illustrated in FIG. 6. As shown, arrangement 70 includes a first member 72 and a second member 74, where second member 74 is sufficiently transparent to the wavelength of the impinging radiation. Second member 74 includes a concentrating region 76, shaped as illustrated in FIG. 6, to direct the radiation toward weld site 78. In particular, concentrating region 76 is formed so as to provide for reflection of the radiation, since an air gap is illustrated as surrounding region 76.

Figure 7:
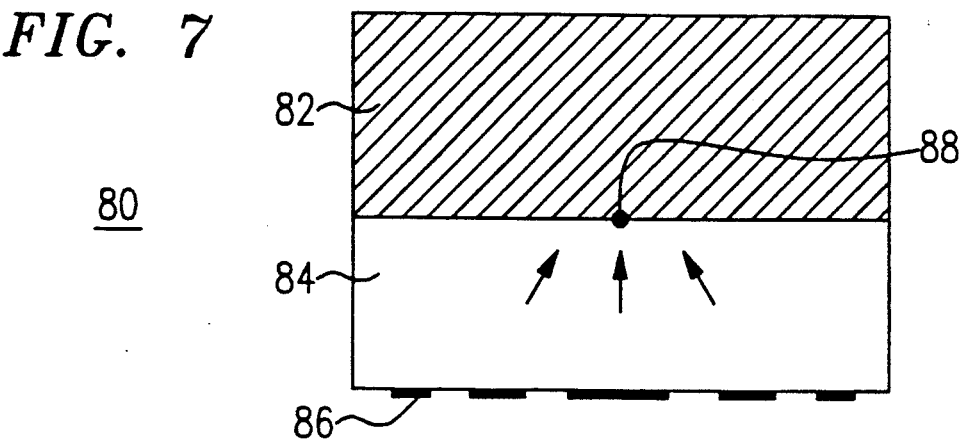

FIG. 7 illustrates yet another embodiment of the present invention which may be utilized with a transparent concentrating member. In particular, arrangement 80 includes a first member 82 and a second member 84, where second member 84 is sufficiently transparent to the wavelength of the impinging radiation. Second member 84 includes a diffraction grating 86 formed on the surface thereof. In one embodiment, the diffraction grating may comprise a zone plate. As is well-known in the art, a diffraction grating may be formed so as to result in concentrating the impinging radiation at a desired location, in this case at predetermined weld site 88.

Figure 8:
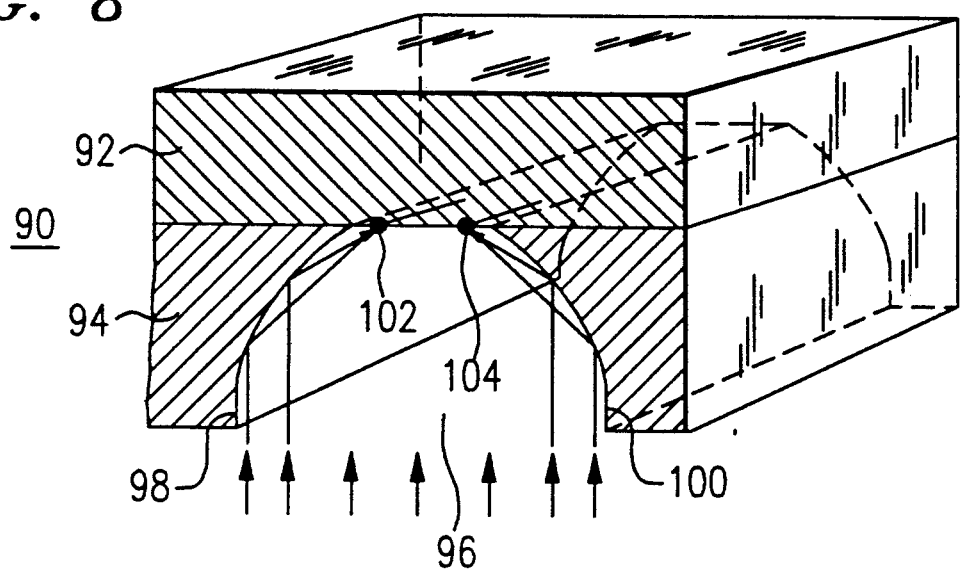
FIGS. 8 and 9 illustrate embodiments of the present invention utilizing aperture geometries capable of forming a plurality of laser bonds within each aperture.

As mentioned above, a concentrating aperture may be formed to include a parabolic-type opening such that a pair of laser welds are simultaneously formed within a single aperture. FIG. 8 illustrates, in a three-dimensional view, an exemplary arrangement 90 wherein a first piece part 92 is to be joined to a second piece part 94. Second piece part 94 includes an aperture 96 with a pair of parabolic-shaped walls in opening 98 and 100, as shown. Therefore, an incoming collimated beam will be directed to the location of parabolic aperture 96, the focal lines being along 102 and 104 in this embodiment. Therefore, a pair of linear laser welds will be formed within a single aperture in accordance with this particular embodiment of the present invention.

Figure 9:
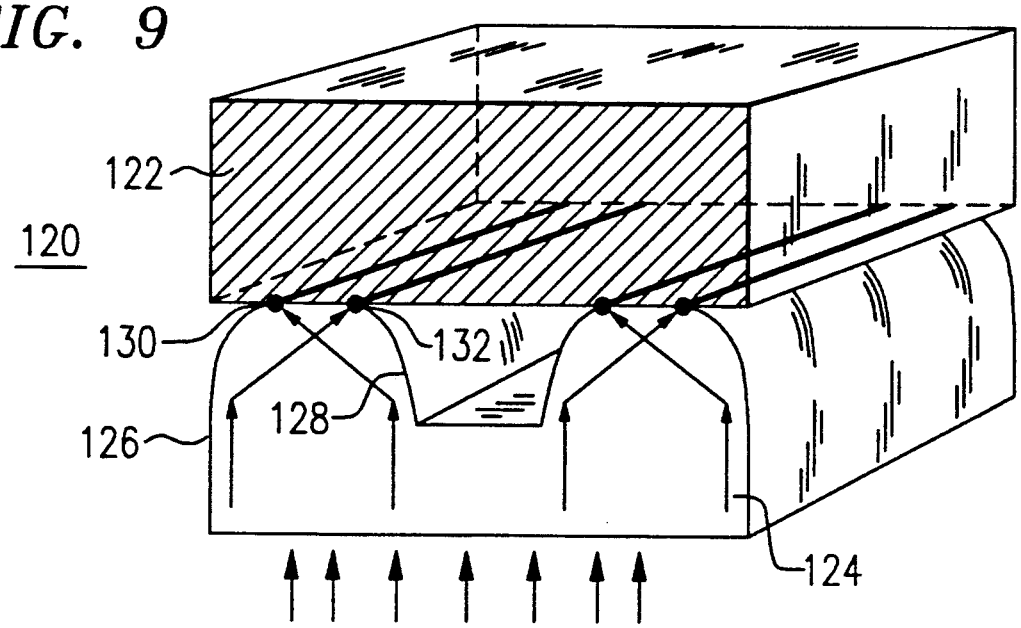

FIG. 9 illustrates an alternative embodiment 120 for providing linear laser welds in accordance with the teachings of the present invention. In this arrangement, a first piece part 122 is to be laser welded to a second piece part 124, where piece part 124 is sufficiently transparent to the wavelength of the optical radiation used to perform the welding operation. Sidewalls 126 of piece part 124 are formed, as shown, to comprise parabolic shapes so as to focus the incoming collimated radiation along lines 130 and 132.

Figure 10:
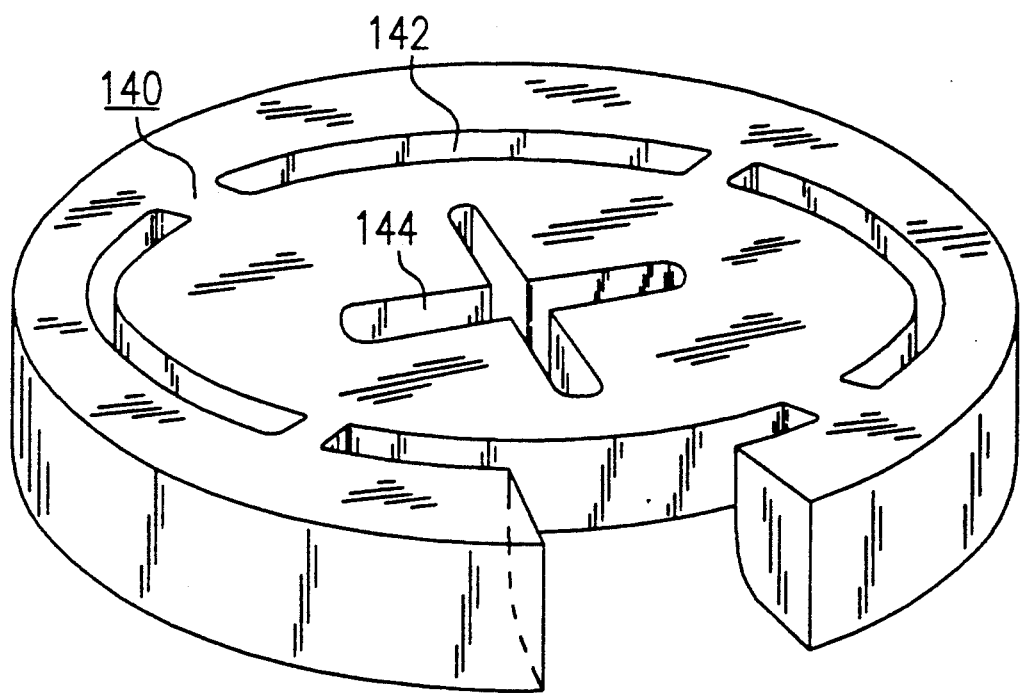
FIG. 10 illustrates an exemplary piece part including a number of differing aperture geometries suitable for use in providing bonding in accordance with the teaching of the present invention.

As mentioned above, various aperture geometries are suitable for providing laser bonding in accordance with the present invention, as long as the aperture provides sufficient concentration of the radiation near the bond location. FIG. 10 illustrates an exemplary piece part 140 including a plurality of various apertures which may be utilized as discussed above. In contrast the embodiments discussed above, the apertures of piece part 140 are shown as terminating in geometries other than a point or straight line. In particular, a set of four apertures 142 are illustrated as terminating in arcs, which may provide for bonding around the periphery of a circular piece part, for example. As with the arrangements discussed above, the apertures are formed to include sidewalls which provide for concentration of the laser radiation along the apex. Aperture 144 is illustrated as terminating in a cross-shaped apex, another suitable form. In general, any desired geometry may be used to provide the desired results.

It is to be understood that there exist may other arrangements suitable for providing concentrated laser attachment in accordance with the present invention. The various embodiments as discussed above are exemplary only, and for the purposes of explanation not limitation. Further, as mentioned above, the concentrating features of the present invention may be utilized with various types of laser-based bonding procedures, including, but not limited to, welding, soldering or tacking

I claim:

1. In an arrangement including a first piece part and a second piece part wherein said first piece part is to be laser bonded to said second piece part in at least one predetermined attachment site, at least one piece part including as a physical feature means for concentrating radiation from said laser toward said at least one predetermined attachment site.

2. An arrangement as defined in claim 1 wherein the concentrating means comprises an aperture including inwardly tapering sidewalls and an apex for concentrating the laser radiation toward the at least one predetermined attachment site.

3. An arrangement as defined in claim 2 wherein the apex of the aperture is coincident with the attachment site.

4. An arrangement as defined in claim 2 wherein the apex of the aperture remains separated from the attachment site.

5. An arrangement as defined in claim 2 wherein the inwardly tapering sidewalls comprise parabolic shapes so as to provide for the formation of a plurality of laser attachments near the apex of the aperture.

6. An arrangement as defined in claim 1 wherein at least one piece part is sufficiently transparent to the wavelength of the laser radiation utilized to provide attachment.

7. An arrangement as defined in claim 6 wherein the concentrating means comprises a feature formed on the surface of at least one transparent piece part at a location capable of providing concentration of the laser radiation at the at least one attachment site.

8. An arrangement as defined in claim 7 wherein the feature comprises a lens.

9. An arrangement as defined in claim 6 wherein the concentrating means comprises a region within the transparent piece part which is tapered so as to provide internal reflection sufficient to concentrate the laser radiation toward the at least one attachment site.

10. An arrangement as defined in claim 6 wherein the concentrating means comprises a diffraction grating formed on the surface of the at least one transparent piece part.

11. An arrangement as defined in claim 10 wherein the diffraction grating comprises a zone plate.

12. An arrangement as defined in claim 1 wherein the first piece part is attached to the second piece part using laser welding.

13. An arrangement as defined in claim 1 wherein at least one predetermined attachment site comprises essentially a point.

14. An arrangement as defined in claim 1 wherein at least one predetermined attachment site comprises essentially a line segment.

15. An arrangement as defined in claim 1 wherein the at least one predetermined attachment site comprises an arc.

16. An arrangement as defined in claim 1 wherein the at least one predetermined attachment site comprises a predefined geometry.

17. A laser bonding process comprising the steps of:
a) providing a first piece part and a second piece part, at least one piece part including as a physical feature means for concentrating laser radiation toward at least one predetermined attachment site used to join said first piece part to said second piece part;
b) radiating said first and second piece parts with a laser such that the radiation impinges said concentrating means and is directed to the at least one attachment site; and
c) maintaining the radiation of step b) for a time period sufficient to provide bonding of said first and second piece parts.

18. The process of claim 17 wherein in performing step a), the concentrating means is formed to comprise an aperture including inwardly tapering sidewalls and an apex for concentrating the laser radiation toward the at least one predetermined attachment site.

* * * * *